(12) United States Patent
Giampaolo

(10) Patent No.: US 10,769,116 B2
(45) Date of Patent: Sep. 8, 2020

(54) SYSTEM AND METHOD FOR PERFORMING OPERATIONS ON A HIERARCHY OF CONTENT

(71) Applicant: Apple Inc., Cupertino, CA (US)

(72) Inventor: Dominic B. Giampaolo, Lewiston, ME (US)

(73) Assignee: Apple Inc., Cupertino, CA (US)

( * ) Notice: Subject to any disclaimer, the term of this patent is extended or adjusted under 35 U.S.C. 154(b) by 602 days.

(21) Appl. No.: 15/387,489

(22) Filed: Dec. 21, 2016

(65) Prior Publication Data
US 2017/0357663 A1    Dec. 14, 2017

Related U.S. Application Data

(60) Provisional application No. 62/348,818, filed on Jun. 10, 2016.

(51) Int. Cl.
*G06F 17/30* (2006.01)
*G06F 16/185* (2019.01)

(52) U.S. Cl.
CPC .................................. *G06F 16/185* (2019.01)

(58) Field of Classification Search
CPC ....... G06F 16/185; G06F 16/10; G06F 3/0647
See application file for complete search history.

(56) References Cited

U.S. PATENT DOCUMENTS

| | | | |
|---|---|---|---|
| 5,857,204 A * | 1/1999 | Lordi | G06F 9/466 |
| 9,529,812 B1 * | 12/2016 | James | G06F 16/148 |
| 2003/0187883 A1 | 10/2003 | Zelenka et al. | |
| 2003/0191938 A1 * | 10/2003 | Woods | G06F 21/6209 713/165 |
| 2011/0264668 A1 | 10/2011 | Hacker et al. | |
| 2012/0185427 A1 | 7/2012 | Fontignie et al. | |
| 2014/0040331 A1 * | 2/2014 | Takaoka | G06F 3/0605 707/827 |
| 2014/0122431 A1 | 5/2014 | Slik | |
| 2015/0046925 A1 | 2/2015 | Costea et al. | |

\* cited by examiner

*Primary Examiner* — Usmaan Saeed
*Assistant Examiner* — William P Bartlett
(74) *Attorney, Agent, or Firm* — Dickinson Wright RLLP

(57) ABSTRACT

Disclosed herein is a technique for performing an operation on a hierarchy of content. The operation is performed atomically by utilizing a hidden directory in a hidden area of a filesystem namespace. In particular, a number of actions associated with the operation are performed in the hidden area to ensure that the hierarchy of content always appears in a consistent state to users and/or system processes.

20 Claims, 6 Drawing Sheets

SYSTEM AND METHOD FOR PERFORMING OPERATIONS ON A HIERARCHY OF CONTENT

CROSS-REFERENCE TO RELATED APPLICATION

The present application claims the benefit of U.S. Provisional Application No. 62/348,818, entitled "SYSTEM AND METHOD FOR PERFORMING OPERATIONS ON A HIERARCHY OF CONTENT" filed Jun. 10, 2016, the content of which is incorporated herein by reference in its entirety for all purposes.

FIELD

The described embodiments set forth a technique for performing operations on a directory in an atomic manner.

BACKGROUND

Performing filesystem operations (e.g., write/delete operations) on directories having a large number of sub-directories/files can take a considerable amount of time. In some cases, when a high-volume operation is performed on a directory, the contents of the directory repeatedly change as sub-directories/files within the directory are being manipulated. As a result, any process that monitors the directory may receive a stream of notifications that cause the process to repeatedly take action before the high-volume process is completed as a whole. For example, when one-hundred files are deleted from a particular directory, a backup process might correspondingly receive over one-hundred different notifications that each cause the backup process to reflect the respective notification (e.g., deleting file no. 1, then deleting file no. 2, and so on). Notably, this repetitive activity can be highly inefficient as each individual backup can involve initializing and tearing down a connection to a backup entity each time a notification is received. Consequently, there exists a need to cure the aforementioned deficiencies related to performing high-volume operations within a filesystem.

SUMMARY

Representative embodiments set forth herein disclose various techniques for performing operations on hierarchies of content within a filesystem. A hierarchy of content can represent a directory and its sub-directories/files that are visible within a primary namespace of the filesystem. As described in greater detail herein, the techniques involve determining when a "hidden" directory—e.g., a directory that is not visible within the primary namespace of the filesystem—can beneficially be utilized to cause an operation performed on a hierarchy of content to appear to be atomic in nature. According to some embodiments, when aspects of the operation satisfy a particular threshold (e.g., a number of operations, an estimated time to perform the operation, etc.), a filesystem manager can be configured to utilize the hidden directory when carrying out the operation. Alternatively, the filesystem manager can be configured to utilize the hidden directory for every operation that is carried out within the filesystem. In particular, the hierarchy of content can be moved to the hidden directory so that any changes being made to the hierarchy of content (as actions associated with the operation are being performed) are not visible to processes (e.g., a backup process) that operate within the primary namespace of the filesystem. Subsequently, the hierarchy of content can be moved back to the primary namespace when all the actions are completed. In this manner, a technique is provided that enables operations to be performed on hierarchies of content in a seemingly atomic manner.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for utilizing a hidden directory in a hidden area of a filesystem to perform an operation on a directory. In particular, the techniques involve identifying that utilizing a hidden directory can be beneficial when an operation is associated with a number of actions that satisfies a particular threshold. Utilization of the hidden directory—which, as previously described herein, is not visible within a primary filesystem namespace—causes the hidden directory to remain inaccessible (e.g., to processes monitoring the primary filesystem namespace) while the actions are being performed. When the number of actions satisfies the particular threshold, the directory can be moved to the hidden directory so that any changes being made to the directory (as the actions are being performed) are not visible to the processes that operate within the primary filesystem namespace. The hidden directory can then be made visible when all the actions are successfully completed. In this manner, the directory maintains the appearance of being in a consistent state.

Accordingly, the techniques described herein provide a mechanism for performing operations on directories in an atomic and consistent manner. A more detailed discussion of these techniques is set forth below and described in conjunction with FIGS. 1-6, which illustrate detailed diagrams of systems and methods that can be used to implement these techniques.

Figure 1:
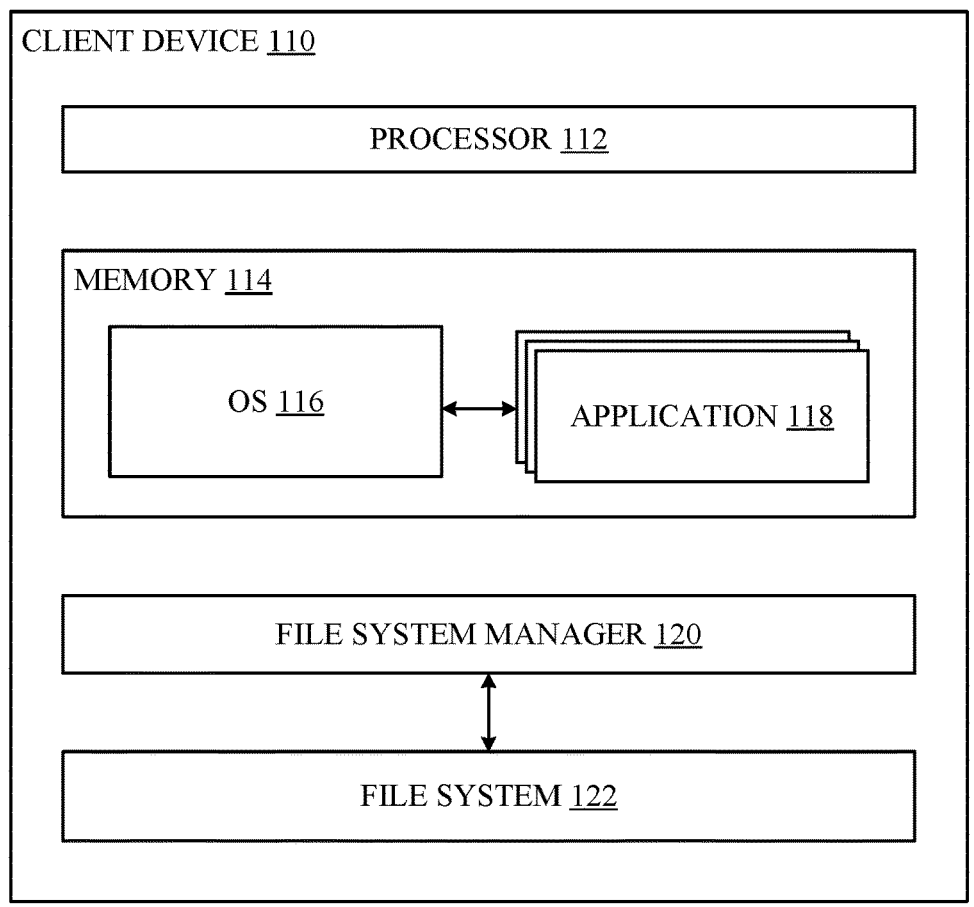
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a client device 110 that can represent a computing device (e.g., a smartphone device, a tablet device, a laptop computer, a desktop computer, etc.). A processor (or CPU) 112, in conjunction with the memory 114, can implement an operating system (OS) 116 configured to execute various applications 118 (e.g., native OS applications and user applications) and other processes/services on the client device 110.

According to some embodiments, the client device 110 includes a filesystem 122 that is used by the OS 116 to manage various files and directories on a storage device (e.g., a disk or other storage device) included in the client device 110. Filesystem manager 120 allows a user of the client device 110 to interact with the files and directories by carrying out various operations (e.g., move, copy, clone, rename, delete, search, etc.). According to some embodiments, the filesystem manager 120 can provide a graphical user interface that allows the user to view, manipulate, and request to perform the various operations on the files/directories.

In some cases, any operation on a particular directory that requires a large number of files/sub-directories within the directory to be manipulated can take a significantly long time to complete. Accordingly, in some implementations, when the filesystem manager 120 receives a request to perform a particular operation on the particular directory in a primary filesystem namespace (e.g., the filesystem namespace 202 illustrated in FIG. 2), the filesystem manager 120 determines whether the number of actions to be performed satisfies a threshold. According to some embodiments, the request can include information about the particular operation that enables the file system manager 120 to efficiently determine whether the threshold is satisfied. For example, when thirty files are selected for deletion within a particular folder, the request will indicate the number of selected files and thereby enable the file system manager 120 to immediately determine whether the threshold is satisfied. In some cases, when the request includes other information—e.g., a listing of multiple directories that have been marked for deletion—the file system manager 120 can reference each directory in the listing to identify a number of files/subfolders (and the number files included therein, if any), thereby enabling the file system manager 120 to calculate a total number of files that will be affected by way of the request. In turn, the file system manager 120 can compare the calculated total number of files against the threshold to determine whether the threshold is satisfied.

According to some embodiments, and as previously described herein, the file system manager 120 can also consider thresholds based on an estimated amount of time that it will take to complete a particular operation. For example, when a small number of files are marked for deletion, the number-based thresholds (described above) might not be met. However, if these files are large in size (e.g., high-definition video files), it can be beneficial to utilize the hidden/private directory techniques set forth herein as the operation likely will take some time to complete. In this regard, the file system manager 120 can further be configured to calculate an estimated amount of time to complete the particular operation and compare the estimated amount of time against a time-based threshold. According to some embodiments, the file system manager 120 can be configured to view the number-based thresholds and time-based thresholds with different biases, e.g., based on current configuration parameters, thereby enabling the file system manager 120 to utilize the techniques described herein at effective and practical times.

Figure 2:
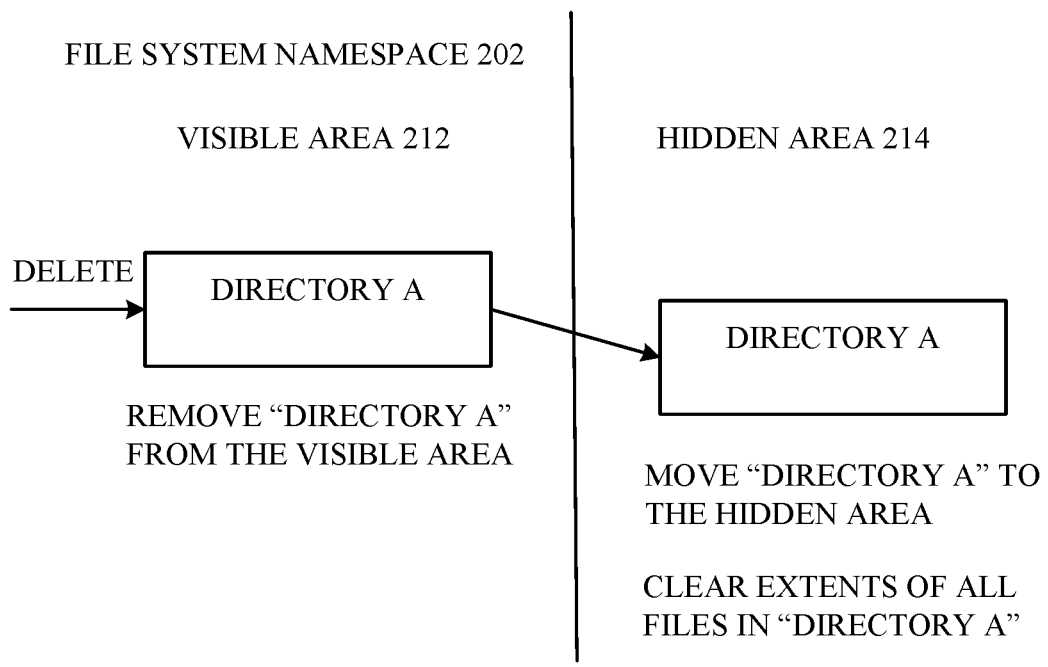
FIG. 2 illustrates a conceptual diagram of a delete operation being performed on a directory in a filesystem of the client device of FIG. 1, according to some embodiments.

In any case, when the threshold is satisfied, the filesystem manager 120 utilizes a hidden or private directory (that is not visible within the primary filesystem namespace) to perform the actions associated with the operation. As shown in FIG. 2, the filesystem namespace 202 of the filesystem 122 can include a visible area 212 that includes files and directories that are visible/displayed to a user of the client device 110 and/or any system processes executing at the client device 110. The filesystem 122 can include a hidden area 214 that includes hidden or private directories that are not visible to the user and/or the system processes.

According to some embodiments, when a request to perform a delete operation (referred to herein as "delete operation request") on a particular directory is received, the filesystem manager 120 typically performs any actions associated with the delete operation on the directory while the directory resides in the visible area 212. When a large number of actions need to performed (e.g., when the directory includes a large number of files), access to the directory is blocked for the time it takes to complete the delete operation. Moreover, at various times during the delete operation, the directory appears to be unstable and inconsistent to the user/system process because the contents and/or size of the directory constantly change within the visible area 212 of the filesystem namespace 202.

To cure this deficiency, FIG. 2 illustrates a conceptual diagram 200 of the delete operation being performed on a particular directory (e.g., "Directory A") in the filesystem namespace 202, where the hidden area 214 is utilized to perform the delete operation. For the delete operation to be successfully completed on "Directory A", a number of actions need to be performed. For example, for each file/sub-directory in "Directory A", a delete action needs to be performed. When "Directory A" includes a large number of files/sub-directories, a large number of individual delete actions need to be performed for each file/sub-directory in "Directory A". In some implementations, when the filesystem manager 120 determines that the number of actions to be performed satisfies a threshold, filesystem manager 120 determines that the hidden area 214 can be utilized to perform the delete actions on the files/subdirectories within "Directory A" to prevent the delete operation from being visible to the user and/or the system processes.

In some implementations, in response to receiving the delete operation request for "Directory A"—and, in response to a determination that the number of delete actions associated with the delete operation satisfies the threshold—the filesystem manager 120: (1) removes "Directory A" from the visible area 212, (2) moves "Directory A" to the hidden area 214/hidden directory in the hidden area 214, and (3) performs the delete actions on the contents of "Directory A" in the hidden area 214, where the delete actions are atomically performed. In particular, the filesystem manager 120 performs a delete action for each file in "Directory A", where extents associated with each file are cleared. Thus, by utilizing the hidden area 214/hidden directory—(1) "Directory A" can be substantially instantaneously removed from the visible area 212 giving an indication that the directory is deleted, even though the deletion takes place in the hidden area 214, and (2) inconsistent views of "Directory A" (e.g., changing contents/size) in the visible area 212 are avoided.

According to some embodiments, when a request to perform a clone operation (referred to herein as "clone operation request") on a particular directory is received, the filesystem manager 120 creates a new clone directory and copies all sub-directories/files within the particular directory into the new clone directory. Typically, while the clone operation is being performed, the new clone directory is visible in the visible area 212 of the filesystem namespace 202. However, the new clone directory represents an unstable/inconsistent copy of the particular directory that visually keeps changing as sub-directories/files are being copied.

Figure 3:
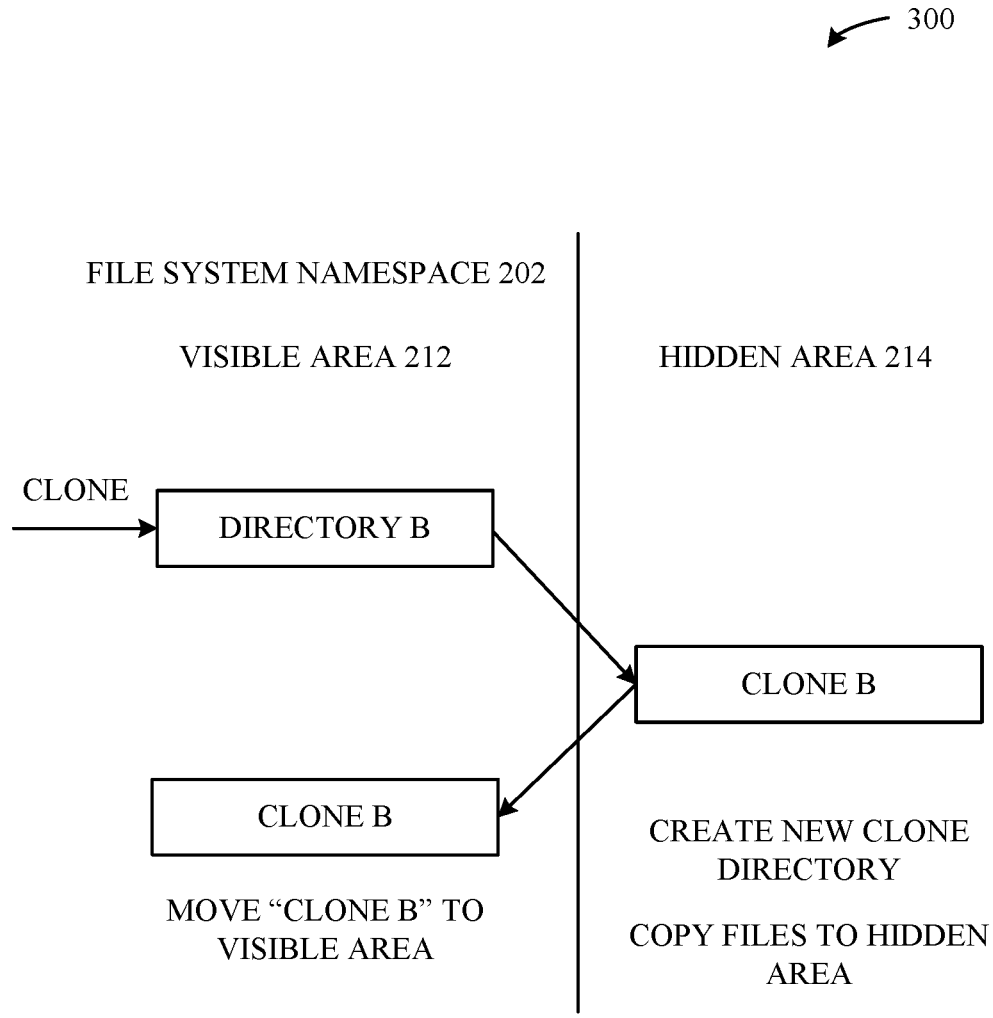
FIG. 3 illustrates a conceptual diagram of a clone operation being performed on a directory in a filesystem of the client device of FIG. 1, according to some embodiments.

To cure this deficiency, FIG. 3 illustrates a conceptual diagram 300 of a clone operation being performed on a particular directory (e.g., "Directory B") in the filesystem namespace 202, where the hidden area 214 is utilized to perform the clone operation. For the clone operation to be successfully completed on "Directory B", a number of copy actions need to be performed (e.g., a copy action for each file/sub-directory in "Directory B"). In some cases, a large number of copy actions need to be performed when "Directory B" includes a large number of files/sub-directories. In some implementations, when the filesystem manager 120 determines that the number of copy actions to be performed satisfies a threshold, filesystem manager 120 determines that the hidden area 214 can be utilized to perform the copy actions on the files/subdirectories within "Directory B".

In some implementations, in response to receiving the clone operation request for "Directory B—and, in response to a determination that the number of copy actions associated with the clone operation satisfies the threshold—the filesystem manager 120: (1) creates a new clone directory in the hidden area 214/hidden directory in the hidden area 214 (e.g., "Clone B," shown in FIG. 3), (2) performs the copy actions on the files in "Directory B", where all the files from "Directory B" are atomically copied to "Clone B" in the hidden area 214, and (3) when all the files have been successfully copied, moves "Clone B" to the visible area 212 in a single transaction. In this manner, any copy actions associated with the clone operation are performed in the hidden area 214, and "Clone B" is made visible to the user/system processes when the copy actions are completed and "Clone B" is in a consistent state.

According to some embodiments, a filesystem manager 120 can receive a request to perform a rename operation (referred to herein as "rename operation request") on a particular directory. The rename operation request can request that "Directory C" be renamed to "Directory D, for example. However, the filesystem manager 120 is typically unable to satisfy the request when "Directory D" includes one or more files (i.e., "Directory D" is not empty). In this scenario, contents of "Directory D" need to be deleted prior to performing the rename operation. Moreover, when "Directory D" includes a large number of files the deletion of the files can take a considerable amount of time.

Figure 4:
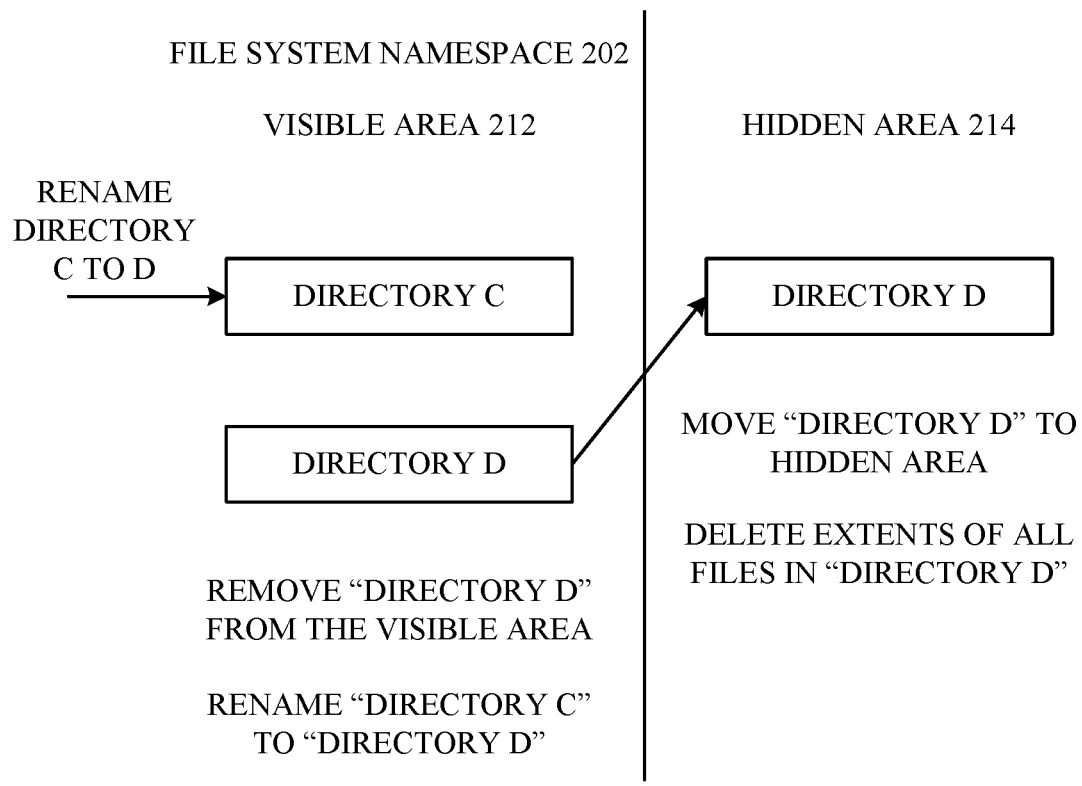
FIG. 4 illustrates a conceptual diagram of a rename operation being performed on a directory in a filesystem of the client device of FIG. 1, according to some embodiments.

To cure this deficiency, FIG. 4 illustrates a conceptual diagram 400 of a rename operation being performed on a particular directory (e.g., "Directory C") in the filesystem namespace 202, where the hidden area 214 is utilized to perform the rename operation. When the filesystem manager 120 receives the rename operation request, the filesystem manager 120 can determine whether: (1) a directory with the name "Directory D" already exists in the filesystem namespace 202, and (2) "Directory D" is empty. In response to a determination that "Directory D" exists and is not empty, the filesystem manager 120 determines that "Directory D" needs to be deleted prior to performing the rename operation. When the filesystem manager 120 determines that the number of delete actions to be performed to delete all the files in "Directory D" satisfies a threshold, the filesystem manager 120 determines that the hidden area 214 can be utilized to perform the delete actions on the files within "Directory D".

In some implementations, in response to receiving the rename operation request—and, in response to a determination that the number of delete actions satisfies the threshold—the filesystem manager 120: (1) removes "Directory D" from the visible area 212, (2) moves "Directory D" to the hidden area 214/hidden directory in the hidden area 214, (3) renames "Directory C" to "Directory D" in the visible area 212, and (4) performs the delete actions on the contents of "Directory D" in the hidden area 214, where the delete actions are atomically performed. In particular, the filesystem manager 120 performs a delete action for each file in "Directory D", where extents associated with each file are cleared.

Although FIGS. 2-4 depict three types of operations for which the hidden area 214/hidden directory in the hidden area 214 can be utilized, it is noted that these operations are exemplary and other operations can be performed as well without departing from the scope of this disclosure. For example, the other operations can include a write operation associated with a directory that requires a large number of write actions to be performed to write files into the directory, a download or upload operation associated with a directory that requires a large number of write/copy actions to be performed, and the like.

According to some embodiments, the techniques described herein can be utilized for any operation that requires a large number of actions to be performed (i.e., a number of actions that satisfies a threshold). For example, the filesystem manager 120 can track when a new directory is added to the filesystem namespace 202. In turn, the filesystem manager 120 can trigger a sync operation to be performed with a remote cloud-based service, where contents of the new directory are moved/uploaded to the remote cloud-based service. This sync operation can be performed using the hidden area 214 when the new directory contains a large number of files/directories, which requires a large number of move/copy actions to be performed. In some implementations, the technique can also be utilized when: (1) contents of two directories need to be swapped while preserving node numbers, (2) an application/application bundle having a large number of files is to be installed or manipulated, and/or (3) a document package/bundle having a number of large files/documents is to be manipulated (e.g., uploaded via a web browser).

Figure 5:
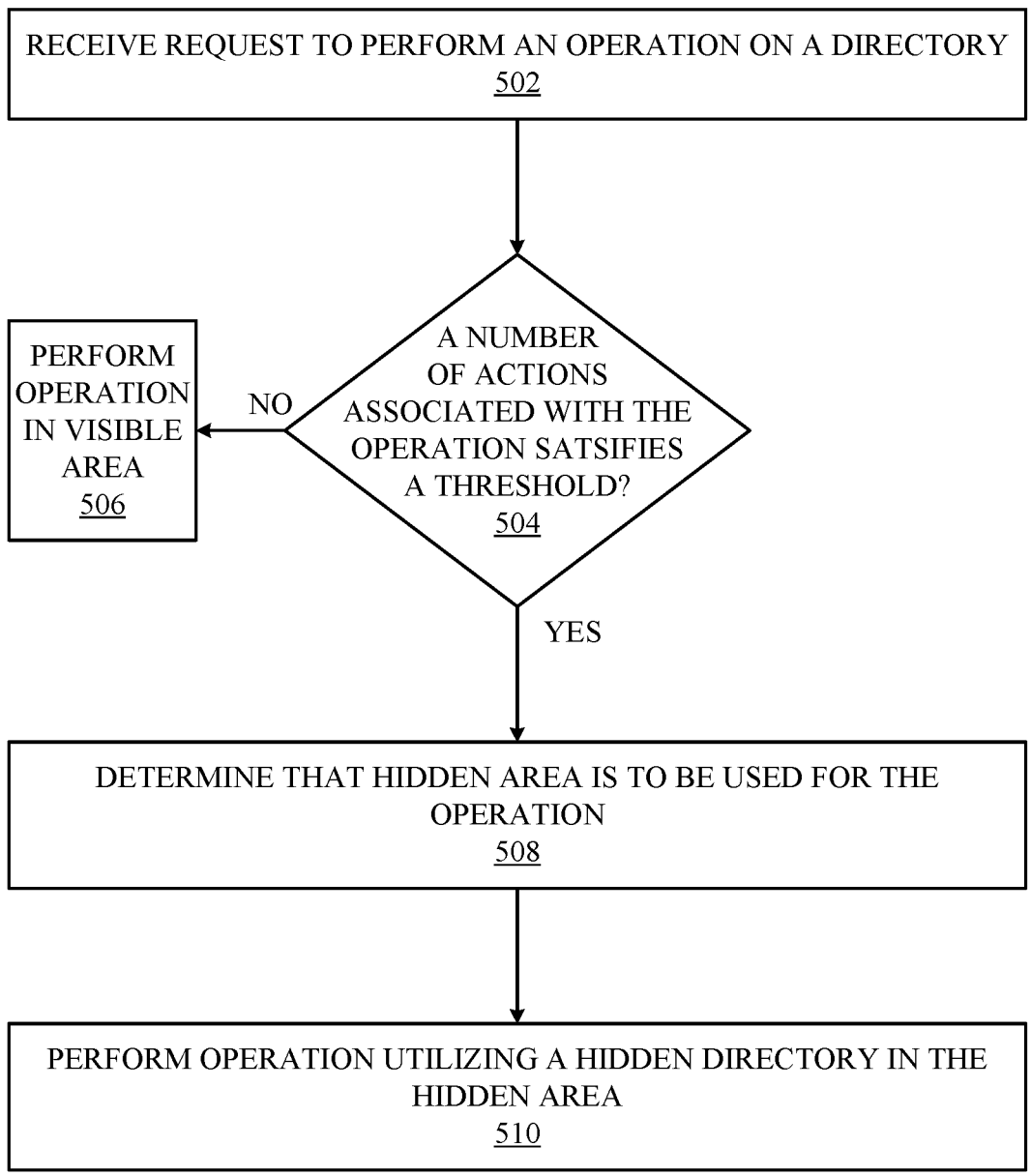
FIG. 5 illustrates a method that is carried out at the client device of FIG. 1, according to one embodiment.

FIG. 5 illustrates a method 500 that is carried out by the filesystem manager 120 operating at the client device 110 of FIG. 1, according to one embodiment. As shown, the method 500 begins at step 502, where the filesystem manager 120 receives a request to perform a particular operation on a directory (e.g., a delete operation). In response, at step 504, the filesystem manager 120 determines whether a number of actions (associated with the operation) to be performed satisfy a threshold. For example, the filesystem manager 120 can determine whether a threshold number of delete actions associated with the delete operation need to be performed for the files/sub-directories in the directory.

In some implementations, in response to a determination that the number of actions to be performed does not satisfy the threshold, the filesystem manager 120 can perform the actions/requested operation in the visible area 212 of the filesystem namespace 202, at step 506. However, in response to a determination that the number of actions to be performed satisfies the threshold, the filesystem manager 120 can determine that the actions/requested operation is to be performed using the hidden area 214/hidden directory in the hidden area 214 of the filesystem 122, at step 508. At step 510, the filesystem manager 120 can utilize the hidden directory in the hidden area 214 to perform the actions/requested operation. For example, for the delete operation on the directory, the filesystem manager 120 can move the directory from the visible area 212 to the hidden directory in the hidden area 214 and perform a number of delete actions on the contents of the directory in the hidden area 214 (as described with respect to FIG. 2 above). In some implementations, the visible area 212 can be updated to reflect the completion of the requested operation in the hidden area 214. In some implementations, the visible area 212 can be updated prior to the completion of the actions associated with the requested operation. For example, the directory can be removed from the visible area 212 giving an indication that the directory is deleted, even though the delete actions are being carried out in the hidden area 214.

It is noted that while the disclosure discusses utilization of the hidden area/hidden directory to perform an operation on a directory when the number of actions associated with the operation satisfy a threshold, the disclosure is not so limited. According to some embodiments, the hidden area/hidden directory is always utilized to perform operations atomically regardless of the number of actions associated with the operations or the number of files/sub-directories in the directory.

Figure 6:
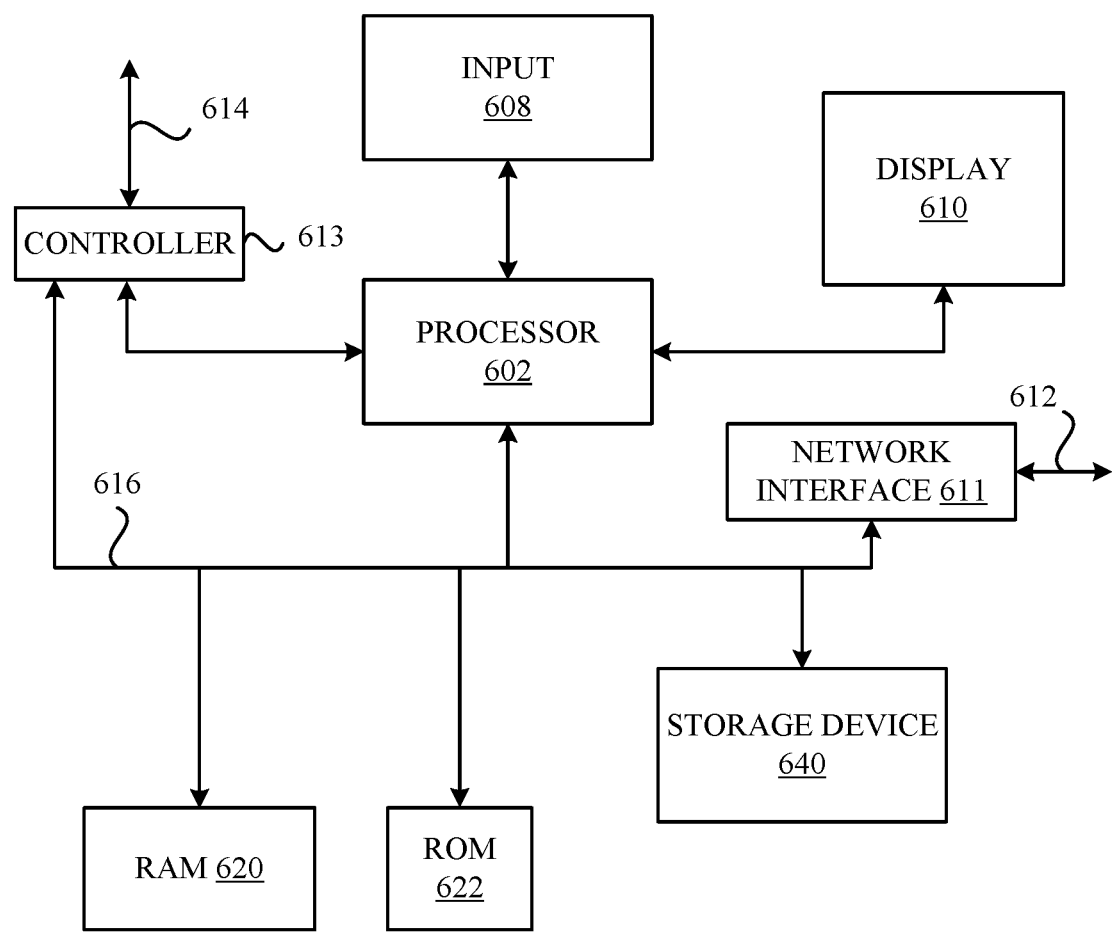
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the client device 110 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user (for example, email interface described herein). A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also includes the storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

EMBODIMENTS

The embodiments set forth a method for performing an operation on a directory. According to some embodiments, the method includes the steps of: (1) receiving a request to perform the operation on the directory, wherein the directory resides in a visible area of a filesystem namespace, (2) determining whether a number of actions associated with the operation satisfies a threshold, and (3) in response to a determination that the number of actions associated with the operation satisfies the threshold: determining that a hidden directory in a hidden area of the filesystem is to be utilized to perform the number of actions associated with the operation, and performing the number of actions in the hidden area of the filesystem.

In some embodiments, the operation comprises a delete operation, and the actions comprise delete actions to be performed on a plurality of files within the directory. According to some embodiments, the steps further include moving the directory from the visible area of the filesystem namespace to the hidden directory in the hidden area of the filesystem, and performing the number of delete actions on the plurality of files while the directory is in the hidden area of the filesystem. In some embodiments, the operation comprises a clone operation, and the actions comprise copy actions to be performed on a plurality of files within the directory. According to some embodiments, the steps further include: creating a new directory in the hidden area of the filesystem, performing the number of copy actions on the plurality of files, wherein the plurality of files are copied from the directory to the new directory, and moving the new directory to the visible area of the filesystem namespace. In some embodiments, the new directory is moved to the visible area after the number of copy actions are successfully completed. In some embodiments, the operation comprises a rename operation to rename the directory to a second directory, and the actions comprise delete actions to be performed on a plurality of files within the second directory.

According to some embodiments, the steps further include: determining whether the second directory is empty, and in response to a determination that the second directory is not empty: removing the second directory from the visible area of the filesystem namespace, moving the second directory from the visible area to the hidden directory in the hidden area of the filesystem, and performing the number of delete actions on the plurality of files while the second directory is in the hidden area of the filesystem. According to some embodiments, the steps further include, in response to a determination that the number of actions associated with the operation does not satisfy the threshold: performing the actions in the visible area of the filesystem namespace.

It is noted that the foregoing method steps can be implemented in any order, and that different dependencies can exist among the various limitations associated with the method steps.

The embodiments additionally set forth a computing device, comprising: a processor and a memory device configured to store instructions that, when executed by the processor, cause the computing device to perform steps that include: (1) receiving a request to perform an operation on a directory, wherein the directory resides in a visible area of a filesystem namespace, (2) when a number of actions associated with the operation satisfies a threshold: determining that a hidden directory in a hidden area of the filesystem is to be utilized to perform the operation, and (3) performing the number of actions in the hidden area of the filesystem.

In some embodiments, the operation comprises a delete operation, and the actions comprise delete actions to be performed on a plurality of files within the directory. According to some embodiments, the steps further include: moving the directory from the visible area of the filesystem namespace to the hidden directory in the hidden area of the filesystem, and performing the number of delete actions on the plurality of files while the directory is in the hidden area of the filesystem. In some embodiments, the operation comprises a clone operation, and the actions comprise copy actions to be performed on a plurality of files within the directory. According to some embodiments, the steps further include: creating a new directory in the hidden area of the filesystem, performing the number of copy actions on the plurality of files, wherein the plurality of files are copied from the directory to the new directory, and moving the new directory to the visible area of the filesystem namespace. In some embodiments, the new directory is moved to the visible area after the number of copy actions are successfully completed. In some embodiments, the operation comprises a rename operation to rename the directory to a second directory, and the actions comprise delete actions to be performed on a plurality of files within the second directory. According to some embodiments, the steps further include: determining whether the second directory is empty, and in response to a determination that the second directory is not empty: moving the second directory from the visible area of the filesystem namespace to the hidden directory in the hidden area of the filesystem, and performing the number of delete actions on the plurality of files while the second directory is in the hidden area of the filesystem. According to some embodiments, the steps further include, when the number of actions associated with the operation does not satisfy the threshold: performing the number of actions in the visible area of the filesystem namespace.

It is noted that the foregoing steps can be implemented in any order, and that different dependencies can exist among the various limitations associated with the steps.

The embodiments additionally set forth a non-transitory computer readable medium configured to store instructions that, when executed by a processor of a computing device, cause the computing device to perform steps that include: (1) receiving a request to perform an operation on a directory, wherein the directory resides in a visible area of a filesystem namespace, (2) determining whether a number of actions associated with the operation satisfies a threshold, and (3) in response to a determination that the number of actions associated with the operation satisfies the threshold: determining that a hidden directory in a hidden area of the filesystem is to be utilized to perform the number of actions associated with the operation, and performing the number of actions in the hidden area of the filesystem. According to some embodiments, the steps further include, in response to a determination that the number of actions associated with the operation does not satisfy the threshold: performing the number of actions in the visible area of the filesystem namespace.

It is noted that the foregoing steps can be implemented in any order, and that different dependencies can exist among the various limitations associated with the steps.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing an operation on a directory, the method comprising:
receiving a request to perform the operation on the directory, wherein the directory resides in a visible area of a filesystem namespace of a filesystem; and
in response to identifying that an estimated amount of time for performing the operation on the directory satisfies a threshold amount of time:
determining that a hidden directory in a hidden area of the filesystem is to be utilized to perform actions associated with the operation,
migrating data within the directory from the visible area of the filesystem namespace to the hidden directory in the hidden area of the filesystem, and
utilizing the hidden area of the filesystem to perform the actions.

2. The method of claim 1, wherein the operation comprises a delete operation, and the actions comprise delete actions to be performed on a plurality of files within the directory.

3. The method of claim 2, wherein migrating the data within the directory comprises:
migrating any files and sub-directories associated with the directory.

4. The method of claim 3, wherein the operation comprises a clone operation, and the actions comprise copy actions to be performed on the plurality of files within the directory.

5. The method of claim 4, wherein migrating the data associated with the directory comprises:
creating a new directory in the hidden area of the filesystem;
performing the copy actions on the plurality of files, wherein the plurality of files are copied from the directory to the new directory; and
moving the new directory to the visible area of the filesystem namespace.

6. The method of claim 5, wherein the new directory is moved to the visible area subsequent to the copy actions being successfully completed.

7. The method of claim 1, wherein:
the operation comprises a rename operation to rename the directory to a second directory, and
the actions comprise delete actions to be performed on a plurality of files within the second directory.

8. The method of claim 7, further comprising:
determining whether the second directory is empty; and
in response to a determination that the second directory is not empty:
removing the second directory from the visible area of the filesystem namespace;
moving the second directory from the visible area to the hidden directory in the hidden area of the filesystem; and
performing the delete actions on the plurality of files while the second directory resides within the hidden area of the filesystem.

9. The method of claim 1, further comprising, in response to determining that the threshold amount of time is not satisfied:
utilizing the visible area of the filesystem namespace to perform the actions.

10. A computing device configured to perform an operation on a directory, comprising:
at least one processor;
at least one memory device configured to store instructions that, when executed by the at least one processor, cause the computing device to:
receive a request to perform the operation on the directory, wherein the directory resides in a visible area of a filesystem namespace of a filesystem; and
in response to identifying that an estimated amount of time for performing the operation on the directory satisfies a threshold amount of time:
determine that a hidden directory in a hidden area of the filesystem is to be utilized to perform actions associated with the operation,
migrate data within the directory from the visible area of the filesystem namespace to the hidden directory in the hidden area of the filesystem, and
utilize the hidden area of the filesystem to perform the actions.

11. The computing device of claim 10, wherein the operation comprises a delete operation, and the actions comprise delete actions to be performed on a plurality of files within the directory.

12. The computing device of claim 11, wherein migrating the data within the directory comprises:
migrating any files and sub-directories associated with the directory.

13. The computing device of claim 12, wherein the operation comprises a clone operation, and the actions comprise copy actions to be performed on the plurality of files within the directory.

14. The computing device of claim 13, wherein migrating the data associated with the directory comprises:
creating a new directory in the hidden area of the filesystem;
performing the copy actions on the plurality of files, wherein the plurality of files are copied from the directory to the new directory; and
moving the new directory to the visible area of the filesystem namespace.

15. The computing device of claim 14, wherein the new directory is moved to the visible area subsequent to the copy actions being successfully completed.

16. The computing device of claim 10, wherein:
the operation comprises a rename operation to rename the directory to a second directory, and
the actions comprise delete actions to be performed on a plurality of files within the second directory.

17. The computing device of claim 16, wherein the at least one processor further causes the computing device to:
determine whether the second directory is empty; and
in response to a determination that the second directory is not empty:
move the second directory from the visible area of the filesystem namespace to the hidden directory in the hidden area of the filesystem; and
perform the delete actions on the plurality of files while the second directory resides within the hidden area of the filesystem.

18. The computing device of claim 10, wherein the at least one processor further causes the computing device to, in response to determining that the threshold amount of time is not satisfied:
utilizing the visible area of the filesystem namespace to perform the actions.

19. A non-transitory computer readable medium configured to store instructions that, when executed by at least one processor of a computing device, cause the computing device to perform an operation on a directory, by carrying out steps that include:
receiving a request to perform the operation on the directory, wherein the directory resides in a visible area of a filesystem namespace of a filesystem; and
in response to identifying that an estimated amount of time for performing the operation on the directory satisfies a threshold amount of time:
determining that a hidden directory in a hidden area of the filesystem is to be utilized to perform actions associated with the operation,
migrating data within the directory from the visible area of the filesystem namespace to the hidden directory in the hidden area of the filesystem, and
utilizing the hidden area of the filesystem to perform the actions.

20. The non-transitory computer readable medium of claim 19, wherein the operation comprises a delete operation, and the actions comprise delete actions to be performed on a plurality of files within the directory.

\* \* \* \* \*